Sept. 12, 1950  C. E. FAY  2,522,259
ELECTRODE TEMPERATURE REGULATION
Filed May 6, 1948  2 Sheets-Sheet 1
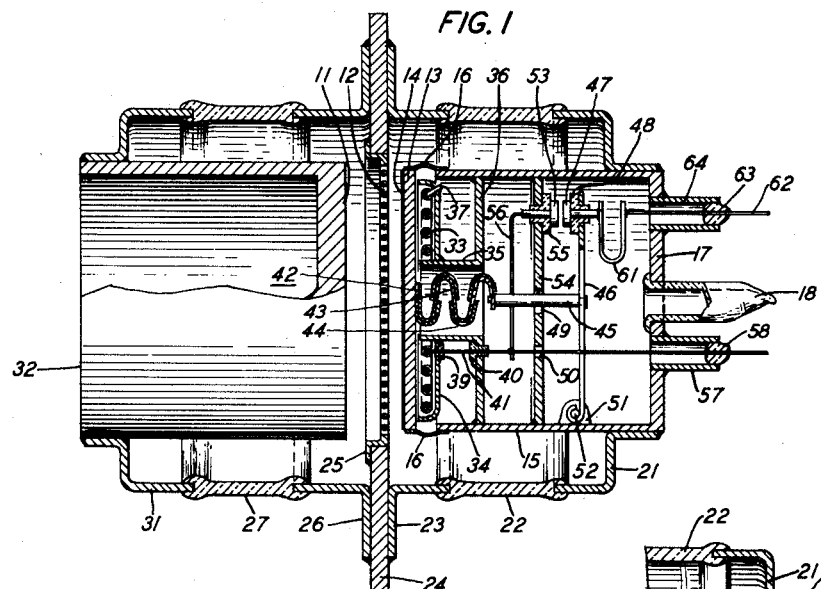
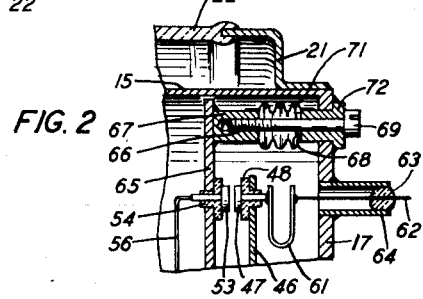
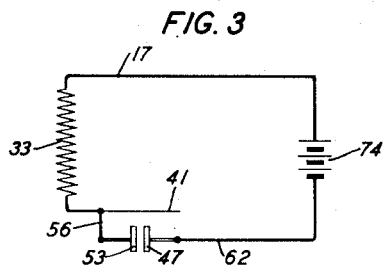
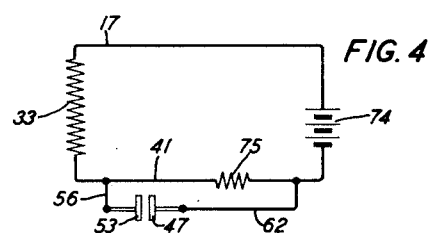
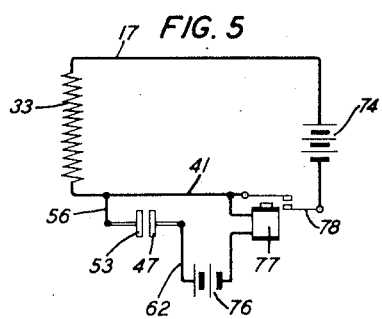
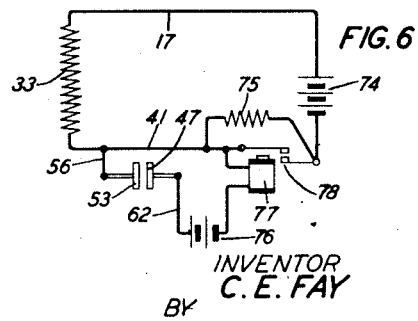
INVENTOR
C. E. FAY
BY
Walter C. Kiesel
ATTORNEY Sept. 12, 1950          C. E. FAY          2,522,259

ELECTRODE TEMPERATURE REGULATION

Filed May 6, 1948          2 Sheets-Sheet 2

INVENTOR
C. E. FAY
BY
Walter C. Kiesel
ATTORNEY

Patented Sept. 12, 1950

2,522,259

UNITED STATES PATENT OFFICE 2,522,259

ELECTRODE TEMPERATURE REGULATION

Clifford E. Fay, Chatham, N. J., assignor to Bell Telephone Laboratories, Incorporated, New York, N. Y., a corporation of New York Application May 6, 1948, Serial No. 25,362

11 Claims. (Cl. 315—112)

This invention relates to space discharge devices having thermionic cathodes and more particularly to temperature regulation means therefor.

An object of this invention is to protect the cathode of a vacuum tube from damage due to overheating.

Another object of this invention is to automatically maintain the cathode temperature substantially at the desired value irrespective of heating or cooling tendencies produced by the operation of the device or by irregularities in the supply of heating energy.

Another object of this invention is to improve the operation of space discharge devices.

A further object of this invention is to enable the vacuum tube to operate at its most advantageous temperature.

It is well known in the art to limit the temperature of the cathode of a vacuum tube by limiting the current in a heater element. It has previously been proposed that the heater current itself should be taken as a measure of the temperature of the cathode. The heating effect of the heater current and the load current of the tube have also been proposed to measure the cathode's temperature. However, a cathode is subject to several phenomena which tend to raise its temperature. Among these are, besides the heating effect of the heater current, the ohmic losses resulting from currents induced in the cathode and the ionic bombardment of the cathode. The effect of the currents induced in the cathode is particularly important in high frequency vacuum tubes. Therefore, in order to obtain an accurate measurement of the temperature of the cathode with which to regulate the heater current it is necessary to measure the temperature of the cathode itself.

The use of an expansible strip attached to the cathode is also well known in the art. However, in the past this arrangement has been proposed in connection with the application to the plate or other electrode of the necessary voltage to commence the operation of the tube after the cathode has reached a sufficiently high uniform temperature. That arrangement prevents emission from starting at only one spot on the cathode surface with the subsequent deterioration of the surface.

In accordance with one feature of this invention, the cathode of the space discharge device, which may be directly or indirectly heated, is maintained at substantially the desired temperature regardless of the heating effects of the operation of the tube, such as ohmic losses in the cathode or ionic bombardment of the cathode, and regardless of undue heating current in the heating circuit.

In accordance with a further feature of this invention, a thermosensitive element is attached to the cathode and thus measures the temperature of the cathode due to all the heating effects that it is subject to.

In accordance with one specific embodiment of the present invention a thermosensitive extensible element is attached to the cathode and the motion of the element is used to control the current in the heater circuit, thus giving continuous regulation of the cathode temperature.

In accordance with another specific embodiment of the invention, a thermocouple is the thermosensitive element attached to the cathode, and variations in the voltage of the thermocouple, suitably amplified, automatically regulate the temperature of the cathode by controlling the heater current.

In accordance with another specific embodiment of the invention, a thermosensitive resistor is attached to the cathode and the variations in the value of the resistance, suitably measured, automatically regulate the temperature of the cathode by controlling the heater current.

A complete understanding of the various embodiments and arrangements contemplated by this invention and of the operations thereof may be gained from consideraion of the following detailed description and the accompanying drawings, in which:

Fig. 1 is a sectional view of a triode illustrative of one specific embodiment of this invention;

Fig. 2 is a sectional view of an adjusting device that may be used with the embodiment of Fig. 1;

Figs. 3, 4, 5 and 6 are circuit diagrams showing various ways of regulating the heater current with the embodiment of Fig. 1;

Figure 7:
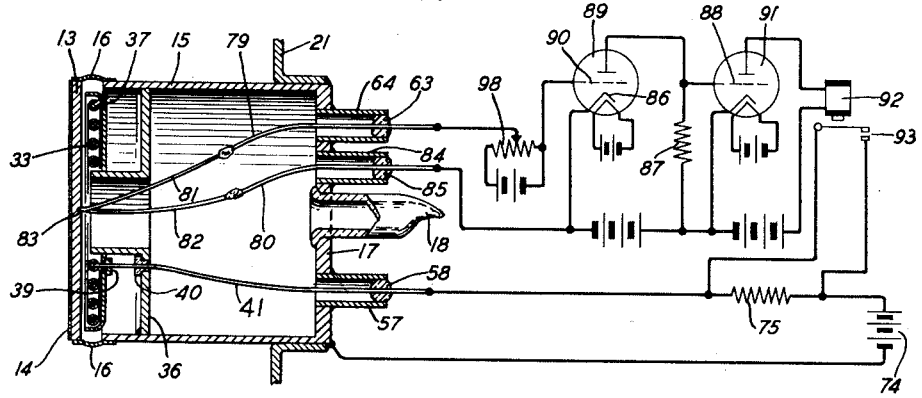
Fig. 7 is a sectional view of a cathode structure and cooperating circuit illustrative of another specific embodiment of this invention.

Referring in detail to the drawings, Fig. 1 shows a triode having an anode 11, a grid 12, and a cathode 13. Cathode 13 is a metallic disc which bears on its outer surface a coating of thermionically active material 14 and is attached to a metallic sleeve support 15 by means of a plurality of thin metallic fingers 16. Sleeve support 15 has an end surface 17. An exhaust tubulation 18 is supported by the end surface 17 as are sleeves 57 and 64 to be described in detail below. A metallic flange 21 is attached to sleeve 15 and insulated from the rest of the tube by an insulating sleeve 22 which may be of glass. A metallic flange 23 is also sealed to the insulating sleeve 22 and is attached to annular metallic ring 24, which carries the grid support 25 and the grid 12. A third metallic flange 26 is attached to the other side of ring 24 and is in turn sealed by a second insulating sleeve 27. A fourth metallic flange 31 seals the insulating sleeve 27 to an anode metallic cup 32 which has anode 11 at its inner surface adjacent grid 12. All joints between members which form the enclosing envelope of the device are hermetic seals such that a vacuum may be maintained within the envelope.

A cathode heater 33 is mounted directly behind the cathode 13 in a shallow annular cup-shaped metallic shield 34 having an aperture therein which is in turn rigidly supported by a metallic sleeve 35 protruding through that aperture in shield 34 and a metallic annular disc 36 which may be integral with sleeve 35 at its one end as shown and is attached to the sleeve 15. The sleeve 35 at its other end is closely adjacent the back of the cathode 13. The heater element consists of a spiral of a suitable metallic wire which is coated with a refractory insulating material. One end of the heater element 33 is conductively fastened to the shield 34, as at 37, while the other end is insulated from the shield and a conductive lead 41 attached thereto. The lead 41 is insulated from the shield 34 by bushing 29 and from the disc 36 by a bushing 40.

A folded bimetallic element 42 extends through sleeve 35 and has one end intimately attached to the back of the disc cathode 13, as by welding, such that heat from the cathode will be easily conducted into the bimetallic element. The element 42 as shown consists of a reentrantly folded expansive metal 43 such as nickel, to which a less expansive metal 44, such as molybdenum, is attached on the outside of the fold such that with increasing temperature the total folded length increases. To the other end of the element 42 there is attached a push rod 45. This rod 45 actuates a movable contact-carrying arm 46 carrying a contact 47 which is insulated from the arm by means of bushing 48. The arm 46 is hinged at its opposite end and attached to sleeve 15 by means of a lug 51 and bolt 52. A fixed contact 53 is seated upon a disc shaped support member 54 by means of an insulating bushing 55. The disc is attached to the sleeve 15 and has a central aperture 49 for the rod 45 and a second aperture 50 for the lead 41 to pass through without its coming into contact with the disc 54. Contact 53 is connected by a conductor 56 to lead 41, and the lead 41 is brought outside the tube envelope through a sleeve 57 in an aperture in end surface 17 and through a lead-in seal 58, which may be of glass. The movable contact 48 is connected by means of a flexible conductor 61 to a lead-in conductor 62, which is supported in sleeve 64 by lead-in seal 63.

It may be desirable to be able to change the operating temperature of the cathode by altering the spacing between the two contacts. This may be accomplished by the structure shown in Fig. 2. The fixed contact 53 is there shown seated, by means of the insulating bushing 55, on a support member 65 which may be in the shape of a disc identical with support member 54 or it may be merely a narrow rectangular strip or arm. It is hinged at a point distant from the contact 53 and attached to the sleeve 15, as by a lug and bolt similar to lug 51 and bolt 52. At another point adjacent to the contact 53 it is supported from the end surface 17 by means of a screw 66 acting in a threaded metal sleeve 67 attached to the support member 65. The screw 66 has also directly attached to it a shoulder 68 so positioned as to bear against the inner surface of the metal bushing 72, thus preventing any motion of the screw 66 outward from the bushing. The screw head 69 bears against the outer surface of the bushing and prevents any inward motion of the screw 66. Bushing 72 is a split bushing, thereby allowing the shoulder 68 to be placed on the screw 66 prior to assembly in the tube, and is solidly connected to the surface 17, as by soldering. A Sylphon bellow 71 is attached to sleeve 67 and to the bushing 72 to permit a hermetic seal about the screw 66.

The operation of the device shown in Fig. 1 will be easily understood with reference to Figs. 3, 4, 5 and 6 which illustrate circuits that may be used with the device of Fig. 1. Referring to Fig. 3 there is a battery 74, or other source of potential, attached to the lead 62 from the movable contact 47 and to the surface 17 which is conductively connected to one end of the heater wire 33 through the sleeve 15, the metallic disc 36, the sleeve 35, and the metallic shield 34, the wire 33 being connected to the shield at 37. The lead 41 from the other end of the heater wire 33 is not connected, and may be omitted in this circuit. It is obvious that the contacts 47 and 53 are directly in the simple series circuit comprising the battery 74 and the heater wire 33. If the cathode is cold, the contacts will be closed allowing the heater current to flow raising the temperature of the cathode to substantially the desired value. As the heater element tends to raise the temperature of the cathode above the desired value, the expansion of the bimetallic element will force the contacts apart, breaking the circuit, and thereby allowing the cathode to cool. Upon cooling, the bimetallic element will contract, closing the contacts, and the heater current will again flow. The parameters of the heater circuit are chosen so that the heater current is larger than required to maintain the desired temperature of the cathode and therefore as the temperature rises again it tends to overshoot that temperature. Thus the contacts are alternately open and closed during the normal operation of the tube.

Fig. 4 shows a similar arrangement except that the heater current is not completely interrupted by opening the contacts, but is only reduced by the insertion of a resistor 75 into the circuit which serves to reduce the heater power to a value insufficient to maintain a high temperature of the cathode. The resistor 75 is connected to the lead 41 from the heater element 33 and to the battery 74 thus being in parallel with the contacts, as shown. Cooling of the cathode somewhat below the desired temperature, allows the contacts to close, increasing the power applied to the heater.

A further circuit arrangement is shown by Fig. 5 where an auxiliary relay 77 and contacts 78 exterior to the tube are used in order to reduce the current required to be carried by the contacts 47 and 53 inside the tube. The operation of this circuit is similar to that of Fig. 3, save that opening of the contacts 47 and 53 breaks the circuit formed by the contacts, the relay 77, and an auxiliary source of voltage, such as battery 76. As there is then no current in relay 77, the contacts 78 open, thus interrupting the heater current.

Fig. 6 shows the same elements as Fig. 5, but with the resistor 75 in parallel with the contacts 78, so that the circuit operates similar to that of Fig. 4, in that the heater current is not entirely interrupted, but merely reduced by the introduction of the resistor 75 below the value necessary to maintain the high cathode temperature.

Fig. 7 shows another embodiment of the invention in which a thermocouple composed of wires 81 and 82 is embedded in the back of the cathode 13, as at 83. Wire 81 may be of iron and 82 of constantan, for example, and they are connected to leads 79 and 80, respectively, which extend outside the vacuum envelope through lead-in seals 63 and 85 in sleeves 64 and 84, respectively, in apertures in surface 17.

The negative wire of the thermocouple, in this case the iron wire 81, is connected through the lead 79 to the grid electrode 90 of a high vacuum amplifier triode 89 through the adjustable bias 98, as shown. The positive wire of the thermocouple, in this case the constantan wire 82, is connected through the lead 80 to the cathode 86 of the tube 89. In operation as the temperature of the cathode 13 of the main tube increases above the desired value, the potential difference of the thermocouple increases, causing the control grid 90 of the tube 89 to become more negative with respect to its cathode 86, thus reducing the current flowing in the plate circuit resistor 87. This causes the grid 88 of a second tube 91 to become less negative and thus the plate current of the tube 91 increases causing the relay 92 to operate opening contacts 93. In the circuit as shown the contacts 93 were short-circuiting the resistance 75 in the heater circuit and thus the opening of the contacts causes a reduction in the heater current allowing the heater to cool. Obviously the resistance 75 could be omitted and the contacts 93 would then completely interrupt the flow of heater current. When the heater cools the reverse of the action described above takes place in the amplifier circuit. The plate current of tube 91 decreases until the relay 92 can no longer hold the contacts 93 open. Upon closing of the contacts 93 the resistance 75 is again shunted thereby increasing the current flowing to the heater element 33.

The operating point of the control circuit may be adjusted by varying the bias 98, thus effectively adjusting the operating temperature of the cathode 13.

The degree of constancy of maintaining the temperature of the cathode constant will depend upon the sensitivity of the means employed. Additional stages of amplification may be employed for greater sensitivity. It will also be apparent that other circuits responsive to variations of the voltage at the terminals of the thermocouple may be employed to regulate the heater power and hence the temperature of the cathode 13.

Figure 8:
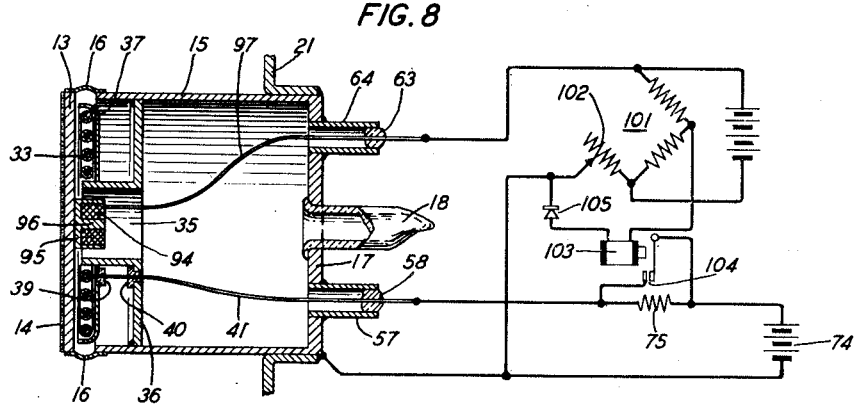
Fig. 8 is a sectional view of a cathode structure and cooperating circuit illustrative of still another specific embodiment of this invention.

Fig. 8 shows another specific embodiment of the invention in which a temperature sensitive resistive element 94 is intimately attached to the cathode 13 such that the temperature of the resistance 94 changes substantially in conformity with changes in the temperature of the cathode 13. The resistive element 94 is of that class of materials whose resistance changes relatively rapidly with temperature changes. For instance the resistance 94 may consist of a coil of small diameter iron wire treated with a refractory insulating coating and embedded in the metallic cup 95, which in turn is firmly attached to the back of the cathode 13 as by welding. The cup 95 is provided with a central portion 96 which is the axial core for the circular winding of the resistance coil 94. One end of the coil of iron wire 94 is conductively attached to the cup 95, and therefore to the cathode 13 and the frame of the tube, and the other end is attached to a conductor 97 which is brought outside the tube through the glass lead-in seal 63 and sleeve 64. In the control apparatus shown in Fig. 8, the temperature sensitive resistance 94 becomes one arm of the bridge network 101. One other arm is a variable resistor 102 so that the operating temperature of the tube may be changed as desired by varying the value of resistance 94 needed to balance the bridge.

When the tube is put into operation, the cathode 13 is cold and the bridge 101 is unbalanced as the resistance 94 is at a low value. There is therefore an unbalance current flowing through the relay 103, keeping the contacts 104 closed and thus shunting out the resistance 75. As the temperature of the cathode 13 increases the bridge becomes more nearly balanced, thereby decreasing the unbalance current in the relay 103. The resistance values are so chosen that when the temperature of the cathode 13 becomes too high the resistance value of resistance 94 balances or so nearly balances the bridge 101 as to decrease the unbalance current below the value necessary to hold the contacts 104 closed. The resistance 75 is then placed in the heater circuit, decreasing the power supplied to the cathode 13 and allowing the temperature to reduce as previously explained. Again if desired the resistance 75 could be omitted and the contacts 104 then would completely interrupt the heater current. As the cathode 13 cools, the resistance 94 decreases unbalancing the bridge again and the unbalance current activates the relay 103, closing the contacts 104 and thereby shunting the resistance 75, thus allowing the temperature of the cathode to again increase. A rectifier 104, which may be of the copper oxide kind, can be added to insure that the relay will not operate if the temperature of the cathode rises so rapidly as to cause it to pass the balance point of the bridge and become unbalanced in the opposite to the desired sense.

By these means the temperature of the cathode can be kept substantially constant and by varying the resistance 102 the cathode temperature can be maintained at any desired value, such as the most efficient for the operation of the tube. It is also apparent that other types of control means can be used to regulate the cathode temperature in response to the resistance of the thermosensitive resistance 94.

Although the invention has been described in connection with a triode, it will be understood that its application is not limited to any one type of space discharge device or to indirectly heated cathodes. Various modifications may be made to the specific embodiments of the invention as shown and described without departing from the scope and spirit of the invention as defined in the appended claims.

What is claimed is:

1. A space discharge device having a thermionic cathode, electrical means for supplying heat to said cathode and means for maintaining the temperature of said cathode substantially constant, said second means including a thermocouple associated with said cathode and actuated in accordance with the temperature thereof.

2. A space discharge device having a thermionic cathode, cathode heating means, and means for maintaining the temperature of said cathode substantially constant, said second means including a thermocouple attached to said cathode and amplifier means external to said device and electrically attached to said thermocouple, regulating the heater current in said cathode heating means.

3. A space discharge device having a thermionic cathode and a cathode heater, and means for regulating the current in said heater, said means including a thermocouple associated with said cathode and actuated in accordance with the temperature thereof.

4. A space discharge device having a thermionic cathode and a cathode heater, and means for maintaining the temperature of said cathode substantially constant, said means including a thermocouple attached to said cathode and amplifier means external to said device and electrically attached to said thermocouple, including a pair of vacuum tubes in cooperation and contacts operable on variation of the plate current of said last vacuum tube.

5. A space discharge device having a thermionic cathode, electrical means for supplying heat to said cathode, and means for maintaining the temperature of said cathode substantially constant, said second means including a thermally sensitive resistance associated with said cathode and actuated in accordance with the temperature thereof.

6. A space discharge device having a thermionic cathode, a cathode heater means, and means for maintaining the temperature of said cathode substantially constant, said second means including a temperature sensitive resistive element attached to said cathode and a bridge circuit containing said resistive element as one arm, and regulating the current in said cathode heater means.

7. A space discharge device having a thermionic cathode and a cathode heater, and means for regulating the current in said heater, said means including a temperature sensitive resistive element associated with said cathode and actuated in accordance with the temperature thereof.

8. A device in accordance with claim 7 wherein said means include a temperature sensitive element attached to said cathode, a bridge circuit containing said resistive element as one arm, and contacts associated with said bridge and operable by the unbalance current thereof.

9. A space discharge device comprising a thermionic cathode having a surface of a thermionically active material on one side thereof, a cathode heater, a container attached to the other side of said cathode, and means for maintaining the temperature of said cathode substantially constant, said means including a coil of resistance wire within said container, said resistance being characterized in that changes of temperature cause pronounced changes in resistance, a bridge circuit external to said device which has said resistance as one arm, and contacts operable by the unbalance current thereof.

10. A space discharge device having a thermionic cathode and a cathode heater, a thermosensitive wire element adjacent said cathode, the electrical characteristics of said element being variable in accordance with the temperature of the element, energizing means for said heater, and means coupled to said thermosensitive wire element and responsive to changes in said electrical characteristics for controlling the energy supplied to said heater by said energizing means to maintain the temperature of said cathode substantially constant.

11. A space discharge device comprising a thermionic cathode having a surface of thermionically active material on one side thereof, a cathode heater, a thermosensitive wire element attached to the other side of said cathode, the electrical characteristics of said element being responsive to temperature changes therein, and means including contacts external to said device operatively coupled to said element and dependent on said electrical characteristics for maintaining the temperature of said cathode constant.

CLIFFORD E. FAY.

REFERENCES CITED

The following references are of record in the file of this patent:

UNITED STATES PATENTS

| Number | Name | Date |
|---|---|---|
| 1,787,300 | Alexanderson | Dec. 30, 1930 |